UNITED STATES PATENT OFFICE.

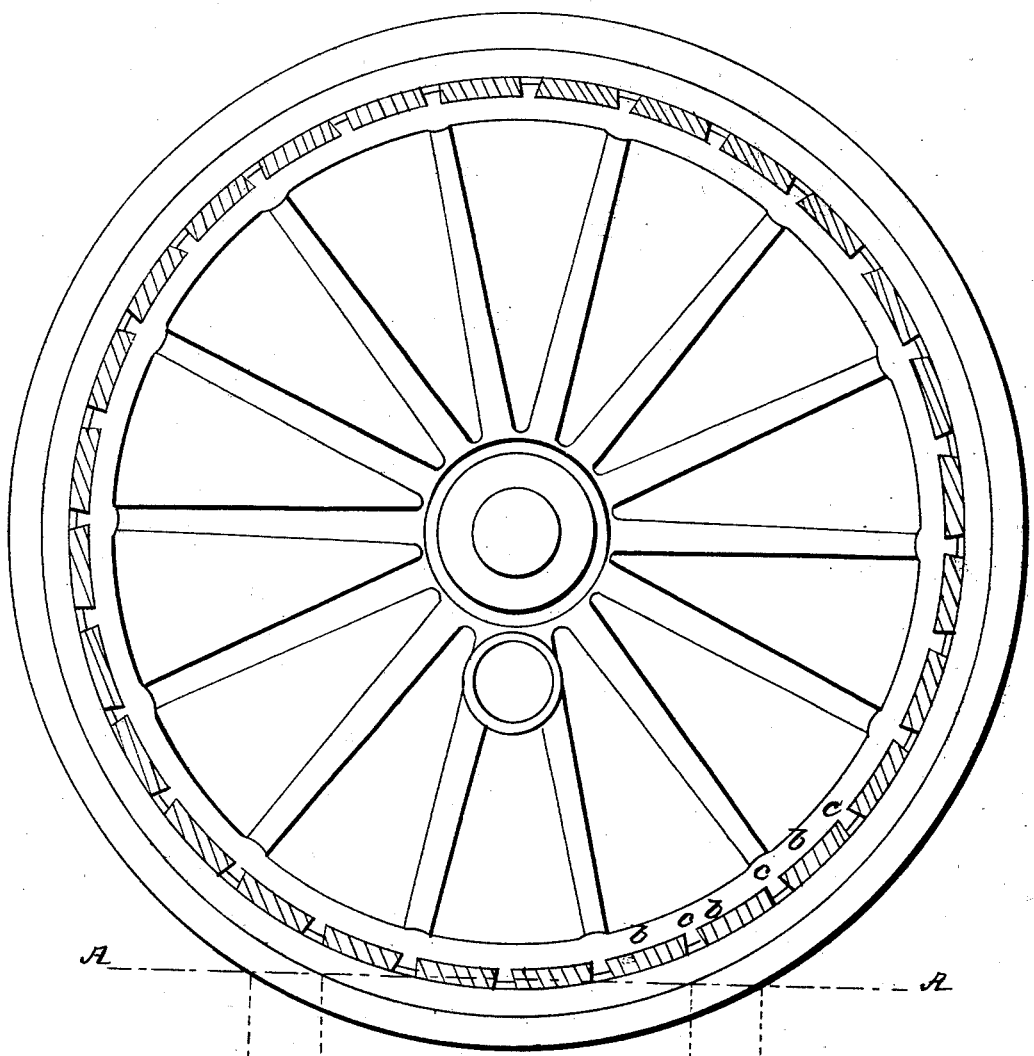

GEORGE S. GRIGGS, OF ROXBURY, MASSACHUSETTS.

LOCOMOTIVE-ENGINE WHEEL.

Specification of Letters Patent No. 18,966, dated December 29, 1857.

*To all whom it may concern:*

Be it known that I, GEO. S. GRIGGS, of Roxbury, in the county of Norfolk and State of Massachusetts, have invented certain new and useful Improvements in Locomotive-Drivers and other Railroad-Wheels, of which the following is a full, clear, and exact description, reference being had to the accompanying drawings, making part of this specification, in which—

Figure 1 is a view of the wheel. Fig. 2 a section upon the line A, A, of Fig. 1.

Efforts have been made to introduce wood between the rim and tire of locomotive and other railroad wheels, but no efficient method has been adopted of keeping the wood in place and of preventing it from being worked out.

To accomplish this end, is the object of my present invention which consists in a peculiar method of confining the wood in dovetailed recesses, whereby it is held confined upon both sides as will now be more fully described.

The wheel, (Figs. 1 and 2, of the said drawings,) is cast with the dovetails c, upon its periphery. These dovetails are wider upon one side of the wheel than upon the other, and thus tapering recesses are formed between them into which are driven the blocks b, b. The wheel is now placed in a lathe and the blocks are turned off. The tire is then heated, and the wheel is dropped into it; to insure the instantaneous cooling of the tire, and prevent the burning of the wood, this part of the operation is performed in a tight box, water in sufficient quantity being at hand to pour in so soon as the wheel is in place. Any hard wood such as maple or hickory may be employed, and to protect the blocks from immediate contact with the heated iron, they may be covered with sheet metal upon the side next to the tire.

Among the advantages possessed by a wheel thus constructed, may be stated, that the tire is not strained either at the time it is shrunk on, or by variations of temperature and unequal contraction and expansion afterward, being protected by the elasticity of the wood. Both the tire and wheel are therefore much less liable to break, and the wheel becomes in consequence more durable and safe.

I do not claim the introduction of wood between the rim and tire of locomotive and other railroad wheels; but What I do claim as my invention and desire to secure by Letters Patent is—

Confining the blocks of wood upon their sides in the manner substantially as herein described for the purpose of preventing them from being forced out and destroyed as set forth.

GEORGE S. GRIGGS.

Witnesses:
SAM. COOPER,
P. E. TESCHEMACHER.